United States Patent [19]

Aoyama et al.

[11] Patent Number: 5,638,940

[45] Date of Patent: Jun. 17, 1997

[54] PARTS SEND-OUT CONTROL DEVICE FOR VIBRATORY PARTS FEEDER

[76] Inventors: Yoshitaka Aoyama; Shoji Aoyama, both of 20-11, Makitsukadai 2-cho, Sakai-shi, Osaka 590-01, Japan

[21] Appl. No.: 537,858

[22] PCT Filed: Feb. 23, 1995

[86] PCT No.: PCT/JP95/00272

§ 371 Date: Jan. 19, 1996

§ 102(e) Date: Jan. 19, 1996

[87] PCT Pub. No.: WO96/03336

PCT Pub. Date: Feb. 8, 1996

[30] Foreign Application Priority Data

Jul. 23, 1994 [JP] Japan ................. 6-201252
Nov. 26, 1994 [JP] Japan ................. 6-330812

[51] Int. Cl.[6] ........................................ B65G 47/22
[52] U.S. Cl. ............................. 198/493; 406/75
[58] Field of Search .................... 198/493, 757, 198/762; 406/10, 12, 16, 75

[56] References Cited

U.S. PATENT DOCUMENTS 4,641,741  2/1987  Oura ....................... 198/493
5,083,654  1/1992  Nakajima et al. ........... 198/493 X

FOREIGN PATENT DOCUMENTS 60-112522  6/1985  Japan .
60-173517  11/1985  Japan .
4-77518    7/1992  Japan .

*Primary Examiner*—James R. Bidwell
*Attorney, Agent, or Firm*—Nikaido, Marmelstein, Murray & Oram LLP

[57] ABSTRACT

In a device for conveying parts delivered from a parts feeder by air ejection, a part detection sensor (22) is installed near an air nozzle (12) disposed in a send-out passage (5), and vibratory motion of the parts feeder is stopped while air is ejected from the air nozzle (12) in response to a part detection signal transmitted by the parts detection sensor (22), ensuring that an excessive number of parts are not accummulated for the conveying ability of the air ejection.

3 Claims, 4 Drawing Sheets

PARTS SEND-OUT CONTROL DEVICE FOR VIBRATORY PARTS FEEDER

TECHNICAL FIELD

The present invention relates to a parts send-out control device for a vibratory parts feeder to be used in the field of sending out parts such as projection nuts from the vibratory parts feeder.

BACKGROUND ART

As hitherto known, parts coming into the send-out passage of the vibratory parts feeder are sent out by force using jet air, and in this case the parts feeder is vibrating continuously.

In such constitution, the parts are continuously transferred from the bowl of the parts feeder into the send-out passage since the parts feeder is always vibrating, so that an excessive number of parts are accummulated ahead of the air nozzle, and hence they cannot be sent out completely with the jet force at the beginning of the air ejection.

DISCLOSURE OF THE INVENTION

The invention is contemplated to solve the above problem, being characterized by an air nozzle for ejecting conveying air in a send-out passage of a vibratory parts feeder, and a part detection sensor disposed in the send-out passage near the air nozzle, wherein the vibratory motion of the parts feeder is stopped and the conveying air is ejected from the air nozzle in responce to a part detection electric signal transmitted by the part detection sensor. As a part sent into the send-out passage passes through the part detection sensor, it is detected and an electric signal is transmitted. Consequently, the vibratory parts feeder is stopped to suspend entry of parts into the send-out passage, and at the same time the conveying air is ejected to the part from the air nozzle toward that part, which is sent out to the desired position.

According to the invention, the part detection sensor is installed in the send-out passage near the air nozzle, and the air is ejected in response to the part detection signal from the part detection sensor, while the vibration of the parts feeder is stopped at the same time. Thus, the number of parts positioned ahead of the air nozzle can be limited so that the number does not exceed the air conveying capacity, ensuring the parts being sent out reliably.

The send-out passage is continuously installed at the terminal end of the spiral passage, and an air nozzle is attached to the end portion of the send-out passage. Hence the structure of the send-out portion of the bowl is simplified, and the direction of jet air can be set securely. Moreover, the air hose and part detection sensor are attached through the bracket welded to the tube member and the outer side of the bowl, resulting in the structure compact and functional.

According to another aspect of the invention, the send-out passage has a vent for allowing the air in the send-out passage in front of the parts to go out. The vent has silencing means, so that the jet air flow out of the vent is silenced by the silencing means.

When the silencing means is composed of porous permeation resisting member, not only resistance is given to the air jet to silence, but impurities such as oil and iron chips are captured by the porous member, and hence these impurities do not scatter outside, which is beneficial also from the viewpoint of sanitation of the working environments.

By thus installing silencing means at the vent of the send-out passage, any noise that would otherwise be made at the vent can be prevented. Being silenced by the silencing action of the porous sound absorbing member, wool-like sound absorbing material, expansion box, or conduit resistance by silencing hose, it is effective for improvement of working environments. Still more, the jet flow out of the vent is relaxed, and the air flow does not collide against the human body, and cold feel is avoided. As the oil, iron chips and other impurities are captures by the permeation resisting member, environmental contamination is prevented.

BEST MODE FOR CARRYING OUT THE INVENTION

Figure 1:
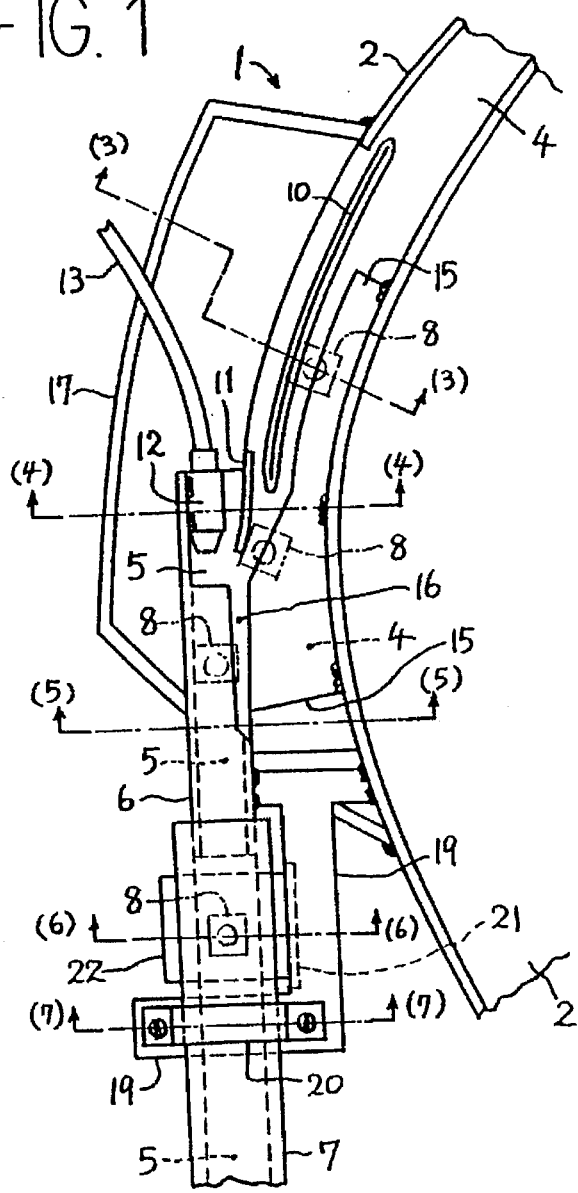
FIG. 1 is a partial magnified plan view of the invention.
Figure 2:
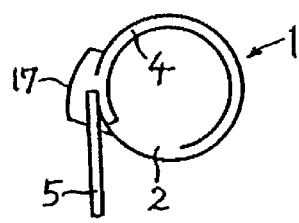
FIG. 2 is a plan view of a vibratory parts feeder.

Describing the invention in detail by referring to an embodiment in FIG. 1 to FIG. 8, a vibratory parts feeder 1 has an excitation unit 3 disposed at the lower side of a circular bowl 2 (FIG. 8), and a send-out passage 5 following a spiral passage 4 formed in the inner circumference of the bowl 2 (FIG. 2). The spiral passage 4 is of shelf-like stepped structure as seen from FIG. 3 and FIG. 4, and the send-out passage 5 square in cross section follows the terminal end of the spiral passage. The send-out passage 5 is formed by connecting a flexible send-out hose 7 made of synthetic resin to a metallic tube member 6. The part 8 in this embodiment is a square projection nut as indicated by double dot chain line in FIG. 1 or as seen from FIG. 3, and has projections 9 for fusion welding formed integrally.

Figure 3:
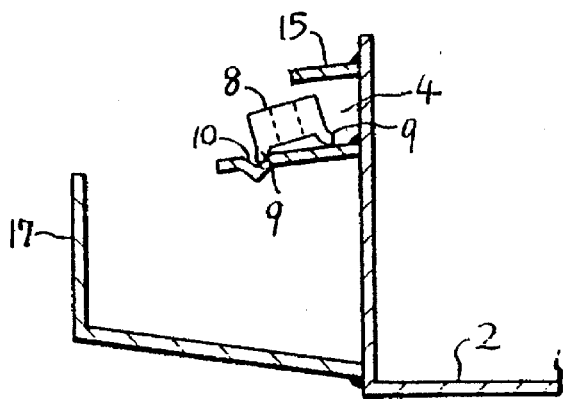
FIG. 3 is a sectional view taken along line 3—3 of FIG. 1.
Figure 4:
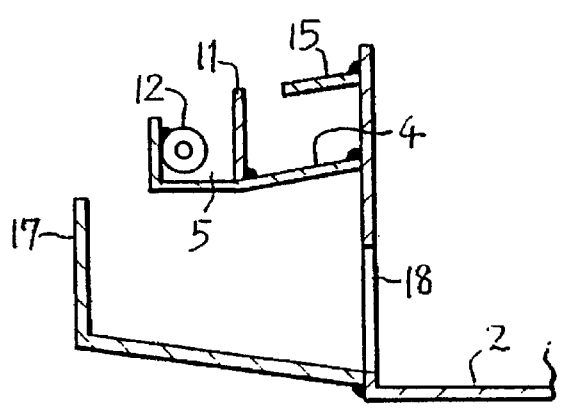
FIG. 4 is a sectional view taken along line 4—4 of FIG. 1.
Figure 5:
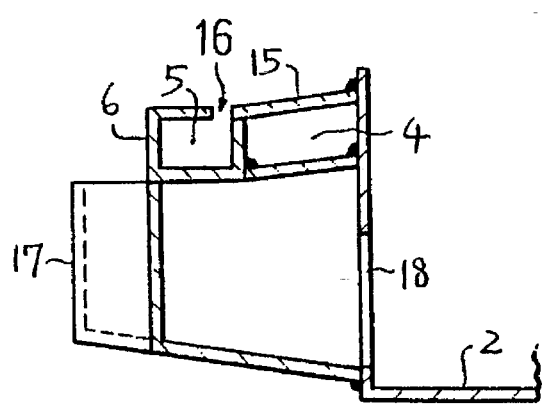
FIG. 5 is a sectional view taken along line 5—5 of FIG. 1.
Figure 6:
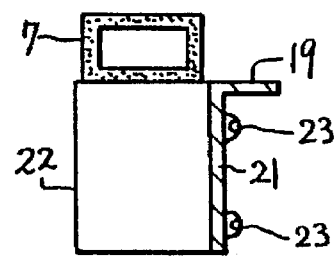
FIG. 6 is a sectional view taken along line 6—6 of FIG. 1.

The spiral passage 4 is a little low at the outer side (FIGS. 3, 4, 5), and has a stopping groove 10 formed therein and terminating in or adjacent the send-out passage 5 (FIGS. 1, 3). A guide plate 11 is installed continuously from the terminal end of the stopping groove 10, and an air nozzle 12 is fixed to its lateral side by welding or the like. The air nozzle 12 is set so that the air jet shoots in the longitudinal direction of the send-out passage 5, and, through an air hose 13, is connected to an air changeover valve 14 (see FIG. 8). To prevent the nut 8 on the spiral passage 4 from being inverted, eaves or an overhanging plate 15 is welded to the bowl 2 and is extended to the place along the tube member 6, with a gap 16 being formed so that the internal nut 8 may be visible.

The nut 8 moving right side out on the spiral passage 4 is caught in the stopping groove 10 by its projections 9, and is therefore moved sequentially by vibration as indicated by double dot chain line in FIG. 1, without dropping out in the outer circumferential direction of the spiral passage 4. If the nut 8 is moving wrong side out, its projections 9 cannot be caught in the stopping groove 10, and therefore it tumbles down to the outer side from the spiral passage 4. To receive it and put back into the bowl 2, a receiving box 17 is welded to the outer side of the bowl 2, and a through hole 18 is formed in the outer plate of the bowl 2.

Figure 7:
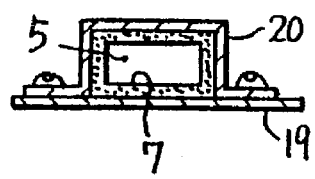
FIG. 7 is a sectional view taken along line 7—7 of FIG. 1.

An inverted L-shaped bracket 19 is welded to the tube member 6 and outer plate of the bowl 2 (FIG. 1), and the send-out hose 7 is supported by the bracket 19 from the lower side, and is tightened by a hat-shaped fitting 20 (FIG. 7). A fixing plate 21 folded downward is provided in the bracket 19 (FIG. 6), and a part detection sensor 22 is coupled thereto by means of bolts 23. The part detection sensor 22 is in contact with the lower surface of the send-out hose 7, and is as close to the air nozzle 12 as possible, and hence the air jet from the air nozzle 12 directly hits against the nut 8 at the position of the part detection sensor 22, and the nut 8 is sent out forcibly. As a representative part detection sensor 22, the proximity switch is most preferred herein, but a contact type limit switch or the like may be also used.

In FIG. 1 the part detection sensor 22 is shown as being supported by the bracket 19 coupled with the bowl 2, but it may be also supported, for example, by a columnar support or the like set up on a stationary frame for mounting the parts feeder 1.

Figure 8:
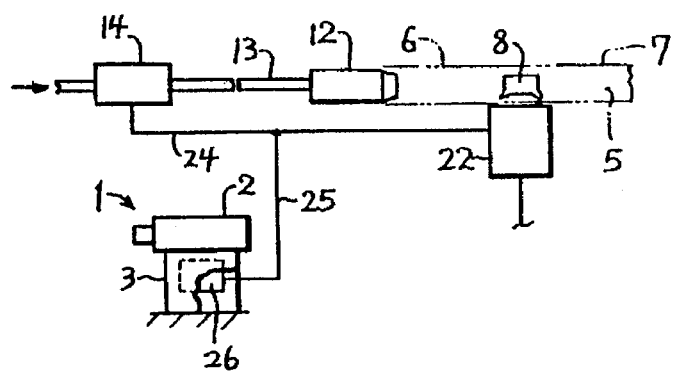
FIG. 8 is a schematic wiring circuit diagram.

FIG. 8 schematically shows wiring of related units, and the electrical relation of the units and the operation of the device will now be described with reference to this diagram. When the nut 8 is detected by the part detection sensor 22 and an electric signal is transmitted to the air changeover valve 14 through a wiring 24, and the valve 14 opens to allow the air in the high pressure air source (not shown) to eject from the air nozzle 12. As a result the nut 8 in the send-out passage 5 is sent out forcibly by the jet air. At the same time, the signal from the part detection sensor 22 is transmitted also to an excitation unit 26 of the parts feeder 1 through a wiring 25, and the vibration of the parts feeder 1 is stopped, thereby limiting flow of parts into the send-out passage 5. Meanwhile, FIG. 8 shows only the energization circuit of detection signal from the parts detection sensor 22, but actually there is also a circuit of power current for driving the air changeover valve 14 and excitation unit 26, and it is omitted herein because it is easily realized by an ordinary circuit. The bowl 2 is vibrated in the combined direction of vertical direction and circumferential direction by the excitation unit 26, and hence the nuts 8 sequentially move on the spiral passage 4 as shown in FIG. 1. When there are two or three nuts 8 between the air nozzle 12 and the part detection sensor 22, they can be sent out by the jet air. If there are five or six or more parts, they can no more be fully conveyed by the air ejecting force, and therefore the vibration of the parts feeder 1 is stopped by the detection signal from the part detection sensor 2 so as to limit the flow of parts into the send-out passage 5.

Figure 9:
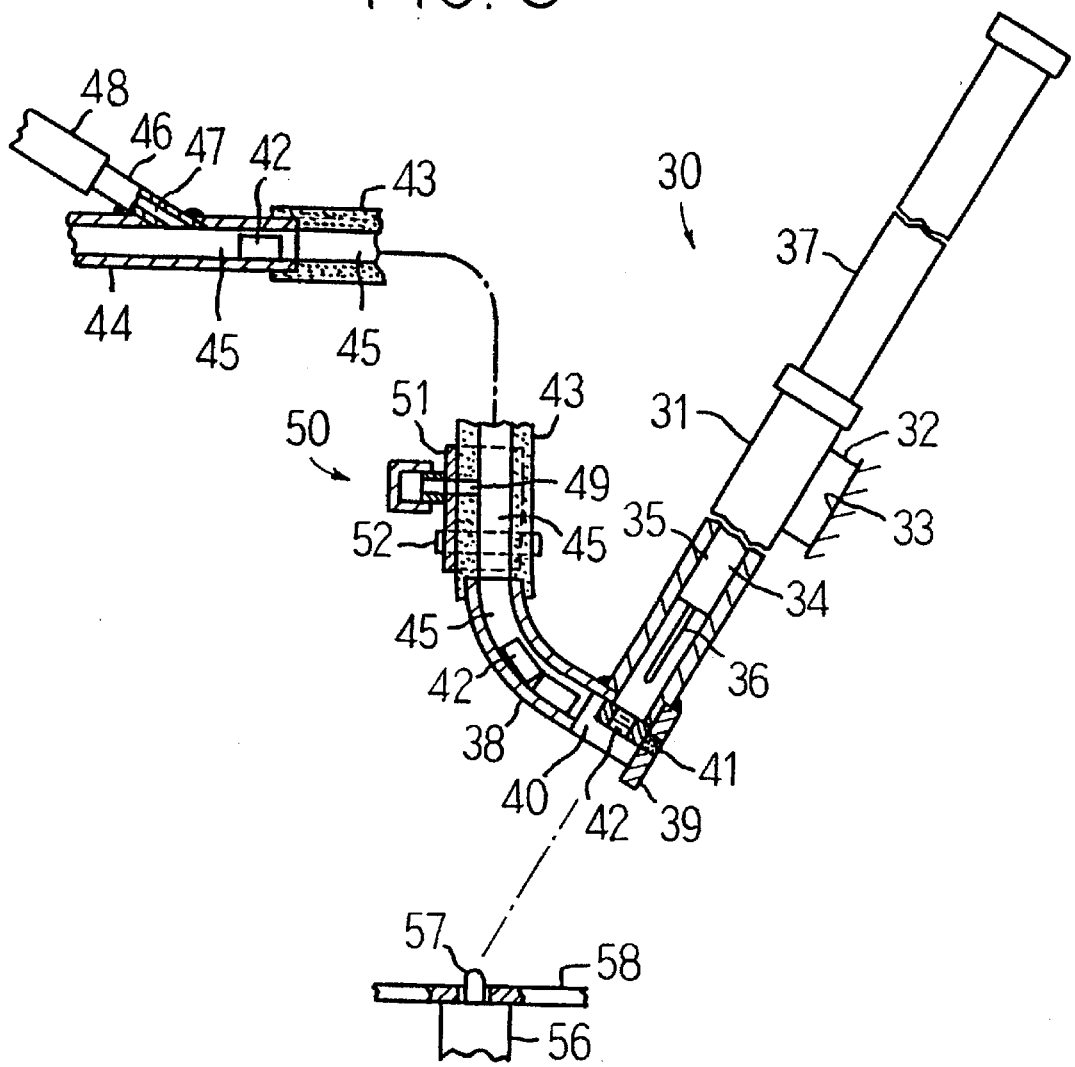
FIG. 9 is a longitudinal sectional view showing an example of device for receiving parts from a parts feeder.

The end portion of the send-out passage 5 is connected to a desired position, that is, the device for receiving supply of parts (see FIG. 9). A control circuit may preferably be proviced, such that the number of parts existing immediately before the desired position is detected, and if, for example, five or six or more parts are detected an electric signal is transmitted for causing the excitation unit 26 to be inactive.

Referring now to FIG. 9 to FIG. 15, the silencing device will now be described.

FIG. 9 shows a parts feed device 30 of feed rod type as the device for receiving supply of parts from the parts feeder. A guide tube 31 is fixed to a stationary member 33 through a bracket 32, and a feed rod 34 is retractably inserted in the guide tube. The feed rod 34 is composed of a large diameter end 35 and a small diameter end 36. An air cylinder 37 is fixed to the upper end of the guide tube 31, and its piston rod is coupled to the feed rod 34. Welded to the lower end of the guide tube 31 is a curved metallic guide tube 38. A guide plate 39 is welded to its end portion, thereby forming a temporary retention chamber 40. A magnet 41 is fitted into the guide plate 39. The part, which is a projection nut 42, is attracted and held by the magnet 41 in the chamber 40 with its screw hole coaxial with the small diameter end 36.

On an extension of the direction of advancement of the feed rod 34, a guide pin 57 of a stationary electrode 56 is positioned, and this guide pin 57 is fitted into the through hole in the steel plate part 58 mounted on the stationary electrode 56, thereby positioning a steel plate part 58. When the feed rod 34 is advanced from the state as shown, the small diameter end 36 penetrates into the screw hole of the nut 42 to be extended close to the guide pin 57, thereby guiding the nut 42 to move toward the guide pin 57.

One end of a feed hose 43 square in cross section is connected to the guide tube 38, and the other end thereof is connected to a send-out tube 44. The feed hose 43 is made of a flexible synthetic resin material, and has a sectional passage area for allowing the square nut 42 as shown to pass therethrough while leaving a slight gap. The dimensions of the nut 42 are, for example, 12 mm by 12 mm and 6 mm high. A parts feed conduit 45 is composed by the internal passages of guide tube 38, feed hose 43, and send-out tube 44. This parts feed conduit 45 corresponds to the send-out passage 5 previously referred to. A nozzle tube 46 is welded to the send-out tube 44, and its injection hole 47 is opened in the send-out tube 44, and an air hose 48 is connected to the nozzle tube 46.

By the jet air from the injection hole 47, a conveying force is given to the nut 42, and as the nut 42 moves, the air in the parts feed conduit 45 in front of the nut is exhausted from an exhaust hole or vent 49, so that the nut 42 is moved smoothly. This vent 49 has silencing means 50, and a mounting member 51 of a pi-section is fitted to the outside of the feed hose 43, and is tightened by the fixing band 52. The silencing means 50 is fixed to the mounting member 51 and hence communicates with the vent 49.

Figure 10:
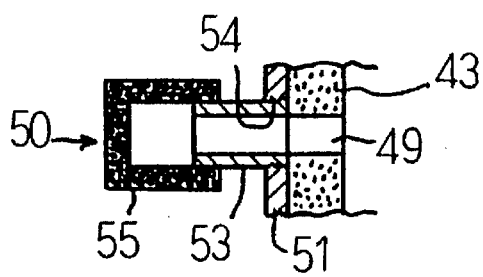
FIG. 10 is a longitudinal sectional view magnifying the silencing means in FIG. 9.

The silencing means 50 in FIG. 9 is magnified in FIG. 10, and explaining more specifically, a joint tube 53 is screwed into the mounting member 51 at a threaded part 54, and a cup-shaped porous permeation resisting member 55 is tightly fitted into the joint tube 53. As the permeation resisting member 55, metal wool densely packed into a cup shape, or sintered alloy may be used, among others, though, the illustrated example is in the form of a sintered porous material of fine spherical granules of copper alloy.

Explaining the action of the embodiment, when the nut 42 is moved by the jet air from the injection hole 47, the air in the parts feed conduit 45 ahead of the nut 42 is exhausted by force from the vent 49, and the air passes through the porous permeation resisting member 55 at this time, and the flow of air is reduced in the whole range of the member 55 and is silenced. Therefore, the flow of air is uniformly dispersed by the member 55 without jet stream from the vent 49 as experienced in the prior art.

Figure 11:
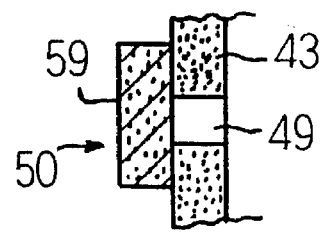
FIG. 11 is a longitudinal sectional view showing silencing means of other type.

Modified examples of silencing means are shown in FIG. 11 and after. Referring first to FIG. 11, a permeable foam body 59 is adhered so as to close the vent 49, and it acts same as the permeation resisting member 55. The foam body 59 is composed of synthetic resin sponge material.

Figure 12:
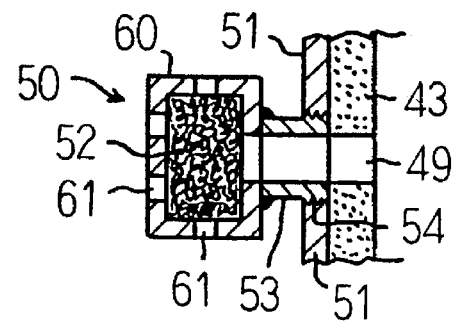
FIG. 12 is a longitudinal sectional view showing silencing means of other type.

In FIG. 12, a silencer box 60 having a plurality of through holes 61 is welded to the joint tube 53. The box 60 is filled with sound absorbing material 62. Steel wool or the like may be suited as sound absorbing material 62. This wool corresponds to the porous material. The air from the vent 49 is discharged uniformly out of the through holes 61, while being silenced by the sound absorbing action of the sound absorbing material 62.

Figure 13:
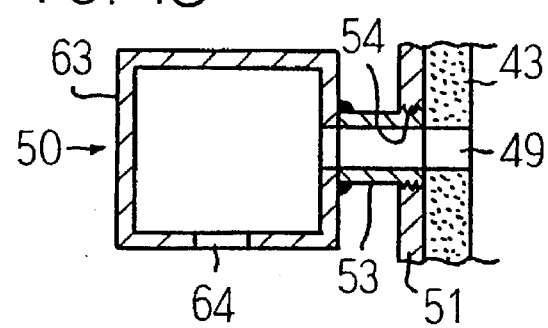
FIG. 13 is a longitudinal sectional view showing silencing means of other type.

In FIG. 13, an expansion box 63 having a through hole 64 is welded to the joint tube 53. The exhaust gets into the expansion box 63 and expands suddenly, resulting in a decrease in kinetic energy and reduction of the sound made by the exaust.

Figure 14:
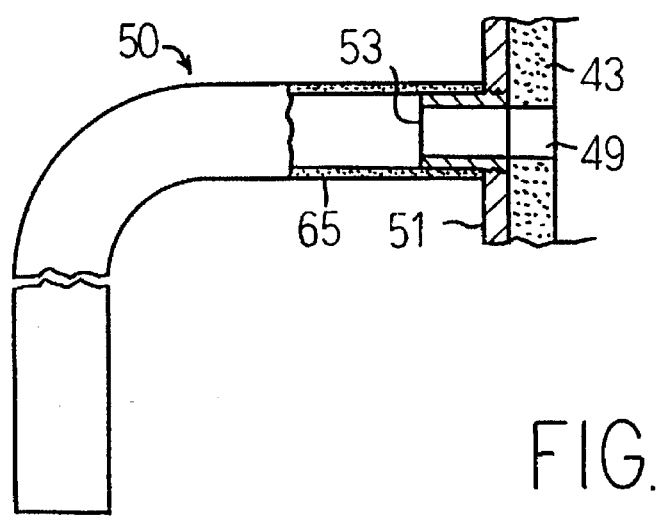
FIG. 14 is a longitudinal sectional view showing silencing means of other type.

In FIG. 14, an elongate silencer hose 65 is connected at one end thereof to the joint tube 53 and the other end thereof is disposed at a position remote from the operator. The air from the vent 49 is subjected to conduit resistance while passing through the silencer hose 65, and is hence silenced as desired. In this embodiment, the silencer hose may be bent in a free form and laid out as desired.

Figure 15:
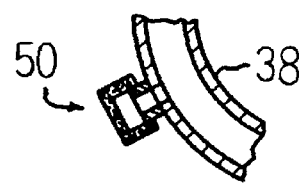
FIG. 15 is a longitudinal sectional view in which silencing means is provided at other position.

In FIG. 15, the silencing means 50 as shown in FIG. 10 is provided in the guide tube 38 in FIG. 9, and the silencing action is same as in FIG. 9 and FIG. 10.

Either one silencing means 50 may be provided as shown in the drawings, or a plurality may be installed depending on the necessity. Or if the silencing means is clogged with impurities such as oil and iron chips, it may be cleaned in gasoline or volatile oil, and may be used repeatedly.

What is claimed is:

1. A parts send-out control apparatus of vibratory parts feeder characterized by an air nozzle for ejecting conveying air in a send-out passage of a vibratory parts feeder, and a part detection sensor disposed in the send-out passage near the air nozzle, wherein the vibratory motion of the parts feeder is stopped and the conveying air is ejected from the air nozzle in response to a part detection electric signal transmitted by the part detection sensor.

2. A parts send-out control apparatus of vibratory parts feeder of claim 1, wherein the send-out passage has a vent for allowing the air in the send-out passage in front of the parts to go out, and silencing means is installed in the vent.

3. A parts send-out control apparatus of vibratory parts feeder of claim 2, wherein the silencing means is composed of a porous permeability resisting member.

* * * * *